United States Patent [19]

Ross et al.

[11] Patent Number: 5,668,922
[45] Date of Patent: Sep. 16, 1997

[54] WATER HEATER HAVING MOLDED PLASTIC STORAGE TANK AND ASSOCIATED FABRICATION METHODS

[75] Inventors: David O. Ross, Montgomery; Timothy D. Gantt, Pike Road, both of Ala.; David C. Poole, Quincy, Ill.

[73] Assignee: Rheem Manufacturing Company, New York, N.Y.

[21] Appl. No.: 558,680

[22] Filed: Nov. 16, 1995

[51] Int. Cl.$^6$ ............................................. F24H 1/18
[52] U.S. Cl. .................. 392/441; 392/450; 392/451; 220/4.21; 122/13.2
[58] Field of Search .................... 392/451, 485, 392/341, 450, 441, 444, 445, 449; 220/444, 445, 466, 4.05, 4.13, 4.24, 4.25, 459; 122/13.2

[56] References Cited

U.S. PATENT DOCUMENTS

| | | | |
|---|---|---|---|
| 1,609,858 | 12/1926 | Bohon . | |
| 1,727,585 | 9/1929 | Carleton | 392/451 |
| 1,954,929 | 4/1934 | Green | 392/451 |
| 2,720,332 | 10/1955 | Holt | 220/4 |
| 3,164,174 | 1/1965 | Berthod et al. | 392/451 |
| 4,424,767 | 1/1984 | Wicke et al. | 392/451 |
| 4,637,347 | 1/1987 | Troy | 122/20 A |
| 4,768,678 | 9/1988 | Nusbaumer et al. | 220/444 |
| 4,780,946 | 11/1988 | Palazzo | 29/455.1 |
| 4,865,014 | 9/1989 | Nelson | 126/361 |
| 4,874,104 | 10/1989 | Klammer et al. | 392/451 |
| 4,878,459 | 11/1989 | Nelson | 220/444 |
| 4,974,551 | 12/1990 | Nelson | 122/494 |
| 4,982,856 | 1/1991 | Stokes | 220/3 |
| 5,167,344 | 12/1992 | Van Schilt | 220/657 |
| 5,179,914 | 1/1993 | Moore, Jr. et al. | 122/17 |
| 5,220,638 | 6/1993 | Moore et al. | 392/449 |

FOREIGN PATENT DOCUMENTS 2089950  6/1982  United Kingdom .

*Primary Examiner*—Tu B. Hoang
*Attorney, Agent, or Firm*—Konneker & Smith, P.C.

[57] ABSTRACT

An electric water heater has a body structure formed in a manner eliminating the need for a separate metal water storage tank therein. The body structure is formed from a coaxially and sealingly joined series of one-piece molded plastic body sections including opposite end sections having closed outer ends. Each one piece molded plastic body section has tubular inner and outer shell portions that are coaxial with one another and radially separated by a circumferentially spaced series of radially extending ribs molded integrally therewith and defining therebetween a circumferentially extending series of arcuate insulation spaces. In the assembled body structure the inner shell portions entirely define in the water heater an internal water storage vessel portion that is outwardly enveloped by the insulation spaces and structurally reinforced, via the integral ribs, by the outer shell sections. Suitable inlet and outlet piping is operatively communicated with the interior of the body structure, and water disposed in the internal storage vessel portion thereof may be selectively heated by one or more electric resistance type heating elements operatively mounted on the water heater body structure.

20 Claims, 2 Drawing Sheets

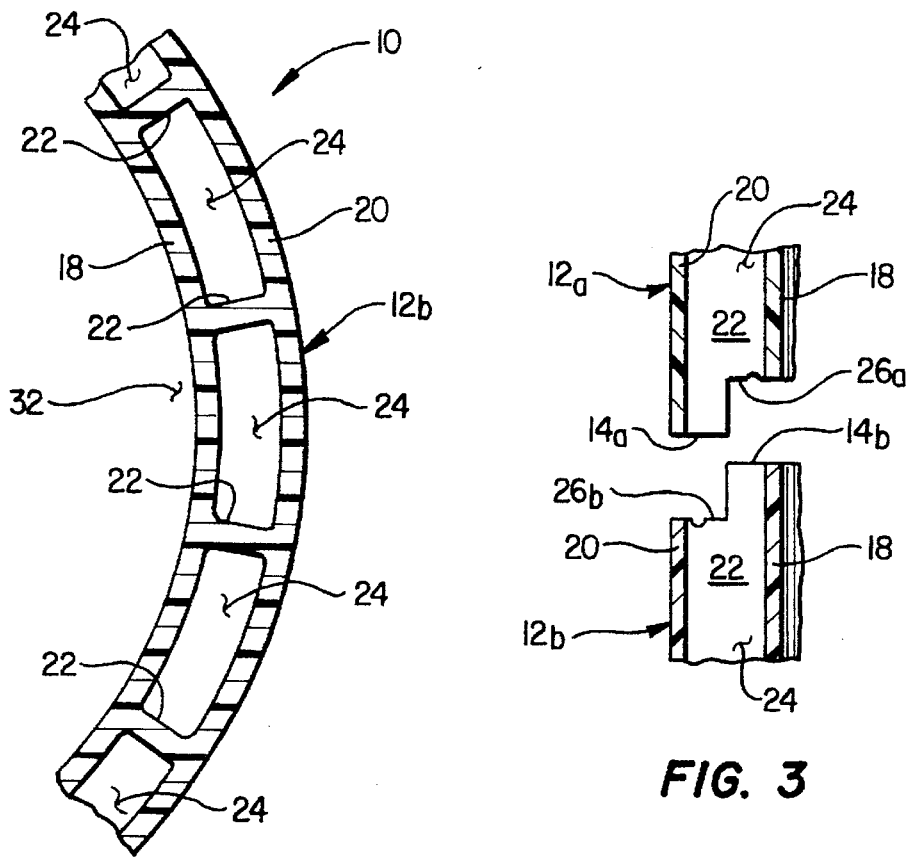
FIG. 2
FIG. 3
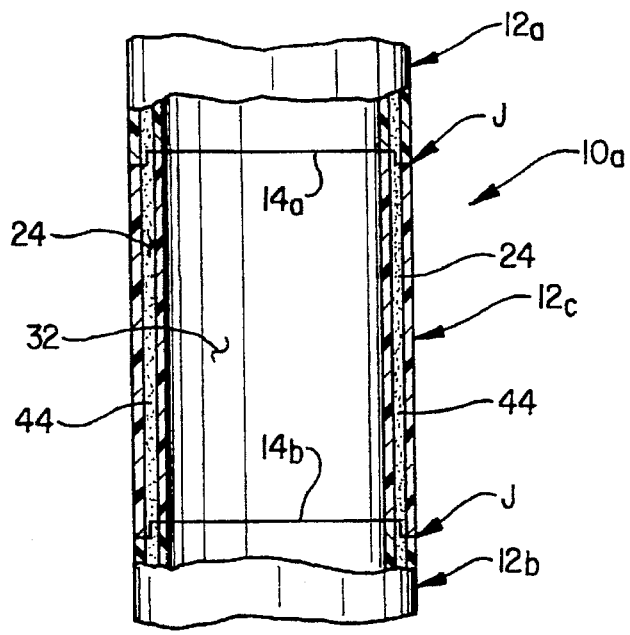
FIG. 4

WATER HEATER HAVING MOLDED PLASTIC STORAGE TANK AND ASSOCIATED FABRICATION METHODS

BACKGROUND OF THE INVENTION

The present invention generally relates to water heaters and, in a preferred embodiment thereof, more particularly relates to a specially designed water heater incorporating therein an all plastic, integrally molded water heater storage tank and outer jacket construction.

Using conventional construction techniques a water heater is typically fabricated by providing a metal storage tank adapted to hold a quantity of water to be heated and later discharged from the tank for use by a remote fixture such as a sink. The tank is externally insulated by wrapping the tank with an appropriate insulation material, such as fiberglass blanket insulation, and then placing a metal jacket structure outwardly around the insulation material to hold it in place and shield it from damage. Alternatively, the blanket insulation may be omitted and foam insulation injected into the space between the tank and jacket structure.

This typical three-component water heater construction (i.e., separate metal tank, exterior metal jacket, and interior insulation medium) has associated therewith several well known problems, limitations and disadvantages. For example, the interior metal storage tank is heavy and, after a period of use, is subject to corrosion to an extent requiring that the entire water heater be replaced. Additionally, the fabrication of the overall water heater assembly is quite labor intensive, requiring various assembly steps and techniques including forming the tank, wrapping it with insulation (or injecting foam type insulation into place), and fabricating and installing the outer metal jacket structure.

This, of course, adds considerably to the cost of the finished water heater. Moreover, the insulation and outer jacket structure function primarily to thermally insulate the tank, and do not appreciably reinforce the tank against the pressure of the stored water therein. Accordingly, the separate metal tank must be designed to solely bear the stored water pressure force, thereby increasing the required thickness (and thus the weight) of the tank.

As can be readily seen from the foregoing, it would be highly desirable to provide an improved water heater, and associated fabrication methods, which eliminated or at least substantially reduced the above-mentioned problems, limitations and disadvantages commonly associated with conventionally constructed water heaters of the type generally described above. It is accordingly an object of the present invention to provide such an improved water heater and associated fabrication methods.

SUMMARY OF THE INVENTION

In carrying out principles of the present invention, in accordance with a preferred embodiment thereof, a water heater is provided that includes a water storage tank portion comprising a plurality of molded plastic one piece hollow tubular body sections which are preferably formed from a reinforced polypropylene-based plastic material using a structural foam plastic molding process. The body sections are positioned in a coaxial, end-to-end orientation and include first and second opposite end sections having closed outer ends.

In one embodiment of the water heater the plurality of body sections include only the aforementioned first and second opposite end sections. In another embodiment the plurality of body sections include the first and second opposite end sections together with at least one open-ended body section coaxially interposed between the first and second opposite end sections.

Each one-piece molded plastic body section has (1) a tubular inner shell section, (2) a tubular outer shell section coaxially circumscribing the tubular inner shell section and forming therearound an annular insulation space, and (3) a circumferentially spaced series of ribs extending radially across the annular insulation space and dividing it into circumferential segments. The ribs are integrally molded with the inner and outer shell sections, and each of the closed outer ends of the first and second opposite end sections are integrally molded with the balance of its associated outer end section.

Joining means are provided for sealingly joining opposing open end portions of each axially adjacent pair of the body sections in the end-to-end array thereof to form therefrom a hollow water heater body structure having an internal water storage vessel portion defined entirely by the inner shell sections of the joined body sections, outwardly enveloped by the annular insulation spaces and structurally reinforced, via the various integral body section ribs, by the outer shell sections of the joined body sections.

In a preferred embodiment of the water heater body structure, the joining means include annular, interlocked axially notched portions formed on each axially facing pair of open end portions of the body sections and sealingly joined to one another by an induction welding process or other suitable joining method such as, for example, sonic welding or friction welding. The rib-divided insulation spaces within the body structure may be left empty, in which case the atmospheric air therein serves to thermally insulate heated water stored within the internal plastic vessel portion of the body structure, or filled with a suitable separate thermal insulation material, such as an aerogel material, to further isolate the stored water from outward heat loss.

Additionally the water heater comprises supply means for flowing water to be heated from an external source thereof into the interior of the internal water storage vessel portion; heating means, representatively at least one electric resistance heating element, operative to heat water disposed within the internal water storage vessel portion; and outlet means for discharging heated water from the internal water storage vessel portion of the body structure. As will be readily appriciated by those of skill in this particular art, the principles of the present invention may also be advantageously utilized in other types of fluid storage vessel apparatus without integral heating means incorporated therein.

BRIEF DESCRIPTION OF THE DRAWINGS

FIG. 2 is an enlarged scale partial cross-sectional view, taken along line 2—2 of FIG. 1, through a specially designed integrally molded plastic storage tank/outer jacket portion of the water heater;

FIG. 3 is an enlarged, vertically exploded cross-sectional detail view of the portion of the storage tank/outer jacket portion of the water heater disposed generally within the circled area "3" in FIG. 1; and FIG. 4 is a schematic, reduced scale, partially cut away side elevational view of an axial portion of an alternate, three section embodiment of the water heater storage tank/outer jacket structure.

DETAILED DESCRIPTION

Figure 1:
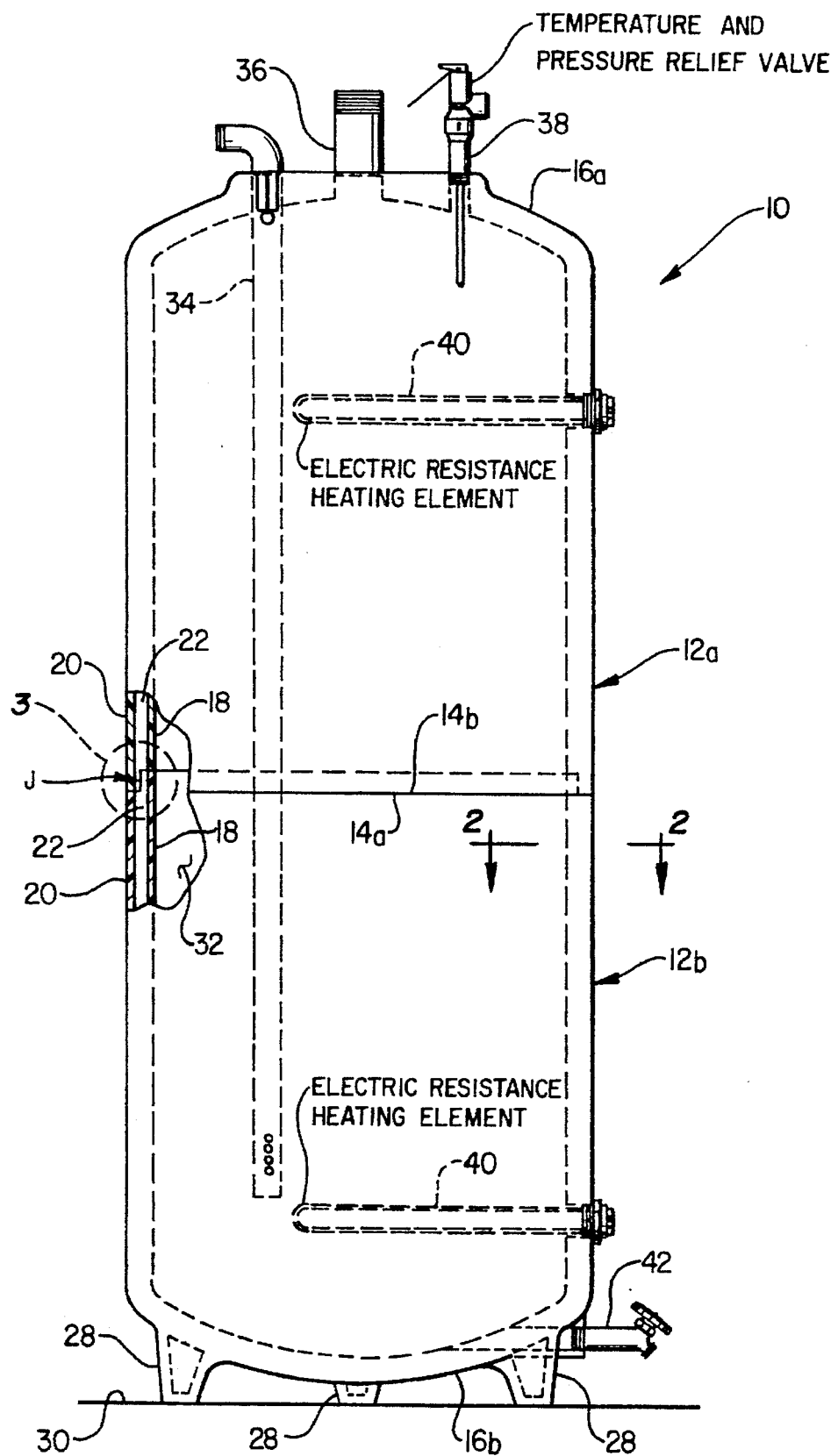
FIG. 1 is a simplified side elevational view of a water heater embodying principles of the present invention.

Referring initially to FIG. 1, the present invention provides a specially designed water heater 10, representatively an electric water heater, in which the conventionally utilized internal metal water storage tank is advantageously eliminated. The water heater 10 has a vertically oriented, generally cylindrical body structure serving as water storage apparatus defined by two hollow cylindrical molded plastic opposite upper and lower end sections 12a,12b. Body structure end sections 12a,12b respectively have vertically facing open ends 14a,14b and domed, closed ends 16a,16b and, while other suitable plastic materials could be utilized in their construction, are preferably molded from a reinforced polypropylene-based plastic material such as that manufactured and sold under the trade name "ACC-PRO" by Amoco Performance Products Company of Alpharetta, Ga. In forming the body structure end sections 12a,12b a structural foam molding process is preferably utilized to thereby provide the resulting body sections with enhanced thermal insulation capability.

Referring now to FIGS. 1–3, each body structure end section 12a,12b has integrally formed therein along its axial length, and around its closed end, a cylindrical inner shell 18; a cylindrical outer shell 20 concentric with and spaced outwardly from the inner shell 18; and a circumferentially spaced series of radially extending reinforcing ribs 22 that join the inner and outer shells and divide the space therebetween into arcuate insulating space segments 24. Complementarily configured annular notches 26a,26b are respectively molded into the facing open ends 14a,14b of the body structure end sections 12a,12b (see FIG. 3).

During the assembly of the molded plastic body structure, these notches are vertically interlocked with one another to form an annular joint J between the end sections 12a,12b (see FIG. 1). The two end sections 12a,12b are then sealingly joined to one another, with the ribs 22 in each section being circumferentially aligned with the ribs 22 in the opposite section, by induction welding the two sections together around the annular joint J. Other joining methods, such as sonic or friction welding, could be alternatively be utilized if desired. Suitable support legs 28 are molded integrally with, and extend downwardly from the closed lower end 16b of the bottom end section 12b and may be rested upon a suitable horizontal support surface, such as the floor 30 shown in FIG. 1, to slightly elevate the water heater body structure above the floor.

To complete the assembly of the water heater 10, various generally conventional components are suitably communicated with the sealed interior 32 of the molded plastic water heater body structure. Specifically, as illustrated in FIG. 1, these components include a cold water inlet pipe 34, a hot water outlet fitting 36 and a temperature and pressure relief valve 38 extending through suitable openings in the closed upper end 16a of the molded plastic body end section 12a; a pair of vertically spaced electric resistance heating elements 40 extending horizontally inwardly through corresponding side wall openings in the body sections 12a and 12b; and a valved drain pipe 42 extending inwardly through the lower end 16b of the body section 12b.

During operation of the water heater 10, cold water from a pressurized source thereof is flowed into the interior 32 of the water heater wherein it is heated by the electric resistance elements 40 and stored. When the plumbing fixture(s) to which the water heater 10 is operatively connected requires hot water, the stored, heated water within the interior 32 of the molded plastic body structure is flowed outwardly through the outlet pipe fitting to the fixture(s) via hot water supply piping (not shown) interconnected between the fixture(s) and the outlet fitting 36. Heated water discharged outwardly through the fitting 36 is automatically replaced by pressurized cold water flowed downwardly through the inlet pipe 34 for heating by the electric resistance elements 40.

It is important to note that in the water heater 10 just described a major conventional component is missing—namely, the conventional metal storage tank within which the incoming pressurized cold water is heated and stored. Accordingly, the weight, expense and corrosion problems associated with the previously necessary metal tank have also been advantageously eliminated in the present invention. In place of the eliminated interior metal tank the inner plastic walls 18 of the molded plastic body sections 12a,12b define a hot water storage vessel that completely and quite economically replaces the customary separate metal tank.

Also advantageously eliminated in the representatively illustrated water heater 10 of the present invention are the separate steps of wrapping insulation around the metal tank exterior and then placing a separate metal jacket outwardly around the insulation to protect it and secure it in place. The interior shell space segments 24 serve as sealed-off insulation chambers disposed between the interior and exterior shells 18,20 and separated by the interior ribs 22, the air within the chambers 24 serving to insulate the stored hot water within the heater 10 against outward heat loss through the molded plastic water heater body structure. This insulation effect is augmented by the structural foam molding process used to form the individual body sections, a process which decreases the thermal heat transfer rates of the resulting molded plastic structures.

The ribs 22 also serve to strengthen the inner plastic tank portion of the heater 10 (defined in its entirety by the inner shells 18) by transferring outwardly directed internal pressure forces imposed thereon to the outer shells 20 via the ribs 22. The outer shells 20 thus not only partially define the insulation space outwardly surrounding the interior shells 18, but also serve as water pressure load-bearing structures as well.

As depicted in FIG. 1 the water heater 10 representatively has two molded plastic cylindrical body sections 12a and 12b joined in an end-to-end fashion as described above, with both of the body sections being "end" or axially outermost sections having closed axially outer ends. If desired, however, the axial length of the water heater body structure could be increased by interposing one or more cylindrical intermediate body sections 12c (each having two open ends) between the previously described body structure end sections 12a,12b to form the alternate embodiment 10a of the water heater shown in FIG. 4.

In such alternate water heater embodiment 10a (in which the various piping and heating elements have been eliminated for illustrative clarity) each open end of each molded plastic body section 12 is induction welded, or otherwise sealingly secured, to the facing open end of the next axial segment of the overall body structure at a joint J. As previously described, the intershell insulation space segments 24 may simply be left empty to permit the atmospheric pressure air therein to serve as an insulating medium. Alternatively, as illustrated in FIG. 4, these insulation space segments 24 may be appropriately filled with supplemental insulation such as the illustrated injected foam insulation material 44.

The foregoing detailed description is to be clearly understood as being given by way of illustration and example only, the spirit and scope of the present invention being limited solely by the appended claims.

What is claimed is:

1. Water storage apparatus comprising:

a plurality of molded plastic one piece hollow tubular body sections positioned in a coaxial, end-to-end orientation in which there is at least one axially adjacent pair of body sections, and including first and second opposite end sections having closed outer ends, each of said body sections having at least one open end portion and further having:

(1) a tubular inner shell section, (2) a tubular outer shell section coaxially circumscribing said tubular inner shell section and forming between said inner and outer shell sections an annular insulation space, and (3) a circumferentially spaced series of ribs extending radially across said annular insulation space and dividing said annular insulation space into circumferential segments, said ribs being integrally molded with said inner and outer shell sections, and said closed outer ends of said first and second opposite end sections being integrally molded with said first and second opposite end sections; and joining means for permanently and sealingly joining opposing contiguous open end portions of each axially adjacent pair of said plurality of body sections in a manner forming from said plurality of body sections a hollow water storage body structure having an internal water storage vessel portion defined entirely by said inner shell sections, outwardly enveloped by said annular insulation spaces and structurally reinforced, via said ribs, by said outer shell sections.

2. The water storage apparatus of claim 1 wherein:

said plurality of body sections includes only said first and second opposite end sections.

3. The water storage apparatus of claim 1 wherein:

said plurality of body sections includes said first and second opposite end sections and at least one additional body section coaxially interposed between said first and second opposite end sections.

4. The water storage apparatus of claim 1 wherein said joining means include:

an induction weld at the opposing open end portions of each axially adjacent pair of said plurality of body sections.

5. The water storage apparatus of claim 1 wherein:

said annular insulation space segments are empty.

6. The water storage apparatus of claim 1 wherein:

said annular insulation space segments are filled with a thermal insulation material.

7. The water storage apparatus of claim 1 wherein:

said plurality of body sections are of a reinforced polypropylene-based plastic material.

8. The water storage apparatus of claim 1 wherein:

said plurality of body sections are structural foam plastic moldings.

9. The water storage apparatus of claim 1 wherein:

each axially facing pair of open end portions of said plurality of body sections have annular, interlocked axially notched portions.

10. The water storage apparatus of claim 1 in which said water storage apparatus is a water heater and further comprises:

supply means for flowing water to be heated from an external source into the interior of said internal water storage vessel portion, heating means operative to heat water disposed within said internal water storage vessel portion, and outlet means for discharging heated water from said internal water storage vessel portion of said hollow water storage body structure.

11. The water heater of claim 10 wherein said heating means include:

at least one electric resistance type heating element extending into said internal water storage vessel portion of said body structure.

12. A method of fabricating water storage apparatus comprising the steps of:

providing a plurality of molded plastic one piece hollow tubular body sections including first and second opposite end sections having a closed outer end, each of said body sections having at least one open end portion and further having a tubular inner shell section, a tubular outer shell section coaxially circumscribing said tubular inner shell section and forming between said inner and outer shell sections an annular insulation space, and a circumferentially spaced series of ribs extending radially across said annular insulation space and dividing said annular insulation space into circumferential segments, said ribs being integrally molded with said inner and outer shell sections, and said closed outer ends of said first and second opposite end sections being integrally molded with said first and second opposite end sections;

positioning said plurality of body sections in a coaxial, end-to-end array, in which there is at least one axially adjacent pair of body sections, with said closed outer ends of said end sections facing axially outwardly at opposite ends of said array; and permanently and sealingly joining opposing contiguous open end portions of each axially adjacent pair of said plurality of body sections to form from said plurality of body sections a hollow water storage body structure having an internal water storage vessel portion defined entirely by said inner shell sections, outwardly enveloped by said annular insulation spaces and structurally reinforced, via said ribs, by said outer shell sections.

13. The method of claim 12 wherein:

said providing step is performed by providing only said first and second opposite end sections.

14. The method of claim 12 wherein:

said providing step is performed by providing said first and second opposite end sections and at least one additional body section coaxially interposable therebetween.

15. The method of claim 12 wherein:

said joining step includes the step of induction welding opposing open end portions of each axially adjacent pair of said plurality of body sections.

16. The method of claim 12 wherein said joining step includes the steps of:

forming annular, axially inwardly extending notches in each axially facing pair of open end portions of said plurality of body sections, and axially interlocking each facing pair of said open end portions using said notches therein.

17. The method of claim 12 further comprising the step of:

filling said annular insulation space segments with a thermal insulation material.

18. The method of claim 12 wherein:

said providing step is performed by molding said plurality of body sections from a reinforced polypropylene-based plastic material.

19. The method of claim 12 wherein:

said providing step includes the step of forming said plurality of body sections using a structural foam plastic molding process.

20. The method of claim 12 further comprising the steps of:

providing supply means for flowing water to be heated from an external source into the interior of said internal water storage vessel portion, operatively extending at least one electric resistance type water heating element into said internal water storage vessel portion of said body structure, and providing outlet means for discharging heated water from said internal water storage vessel portion of said body structure.

* * * * *